United States Patent
Kaise et al.

(10) Patent No.: US 7,319,803 B2
(45) Date of Patent: Jan. 15, 2008

(54) HEAT-RESISTANT OPTICAL FIBER, A METHOD OF MANUFACTURING THE SAME, A METHOD OF FIXING AN OPTICAL FIBER, AND A HEAT-RESISTANT OPTICAL FIBER USING A PROTECTIVE TUBE

(75) Inventors: Tomio Kaise, Ueda (JP); Asuka Nakayama, Ueda (JP); Hidehiko Shimizu, Ueda (JP); Tatuo Yamaguchi, Ueda (JP); Masanori Nonomura, Ueda (JP); Yasushi Murakami, Ueda (JP)

(73) Assignee: Totoku Electric Co., Ltd., Tokyo (JP)

( * ) Notice: Subject to any disclaimer, the term of this patent is extended or adjusted under 35 U.S.C. 154(b) by 0 days.

(21) Appl. No.: 11/352,516

(22) Filed: Feb. 9, 2006

(65) Prior Publication Data

US 2006/0140566 A1    Jun. 29, 2006

(30) Foreign Application Priority Data

Jun. 27, 2005   (JP)   ............................. 2005-186123
Aug. 19, 2005   (JP)   ............................. 2005-238055

(51) Int. Cl.
*G02B 6/02* (2006.01)
*G02B 6/028* (2006.01)
*G02B 6/032* (2006.01)
*G02B 6/036* (2006.01)

(52) U.S. Cl. ....................... 385/128; 385/123; 385/126; 385/127

(58) Field of Classification Search ........ 385/123–128, 385/141–145
See application file for complete search history.

(56) References Cited

U.S. PATENT DOCUMENTS 4,810,836 A * 3/1989 Shinoda et al. ............. 174/139

(Continued)

FOREIGN PATENT DOCUMENTS

JP     6-82608    11/1994

(Continued)

OTHER PUBLICATIONS

Ding et al. "Fibre Optic pH Sensors Prepared by Sol-Gel Immobilisation Technique." Electronics Letters. Aug. 15, 1991. vol. 27, No. 17. pp. 1560-1562.*

(Continued)

*Primary Examiner*—Frank G. Font
*Assistant Examiner*—Derek L. Dupuis
(74) *Attorney, Agent, or Firm*—Jordan and Hamburg LLP (57) ABSTRACT

An optical fiber made of quartz or glass and having a core and a cladding includes a microporous silica solution applied to an outer peripheral surface thereof, which is synthesized from a mixture of silicon alcoxide, active alcohol for facilitating hydrolytic action, alcohol, and water, by means of the sol-gel process, followed by baking to form a thin film of microporous silica made chiefly of silicon. Microporous of the thin film of microporous silica have function of cushioning to cushion and restrain that micro cracks much existing in the cladding undergo growth when the optical fiber is bent so that the optical fiber is likely to be broken. And the thin film of microporous silica which made chiefly of silicon has high heat-resistant properties similarly to the optical fiber itself. Accordingly, a heat-resistant optical fiber very excellent in heat-resistant properties is provided.

3 Claims, 7 Drawing Sheets

U.S. PATENT DOCUMENTS

| | | | |
|---|---|---|---|
| 5,042,898 A * | 8/1991 | Morey et al. ................. 385/37 |
| 5,621,843 A * | 4/1997 | Neuberger .................. 385/123 |
| 2003/0053783 A1* | 3/2003 | Shirasaki .................... 385/128 |
| 2004/0228578 A1* | 11/2004 | Cronk et al. .................. 385/37 |
| 2004/0234221 A1* | 11/2004 | Kringlebotn et al. ....... 385/128 |
| 2005/0129360 A1* | 6/2005 | Andre et al. .................. 385/37 |

FOREIGN PATENT DOCUMENTS

| | | |
|---|---|---|
| JP | 7-6067 | 1/1995 |
| JP | 8-15585 | 1/1996 |
| JP | 2567951 | 10/1996 |
| JP | 10-82919 | 3/1998 |
| JP | 10-197297 | 7/1998 |
| JP | 10-204297 | 8/1998 |
| JP | 2000-306167 | 11/2000 |
| JP | 3203672 | 6/2001 |
| JP | 3232057 | 9/2001 |
| JP | 2004-125846 | 4/2004 |

OTHER PUBLICATIONS

IUPAC, "Nomenclature of Structural and Compositional Characteristics of Ordered Microporous and Mesoporous Materials with Inorganic Hosts.", Pure Appl. Chem., vol. 73, No. 2, pp. 381-394, 2001.*

* cited by examiner

HEAT-RESISTANT OPTICAL FIBER, A METHOD OF MANUFACTURING THE SAME, A METHOD OF FIXING AN OPTICAL FIBER, AND A HEAT-RESISTANT OPTICAL FIBER USING A PROTECTIVE TUBE

BACKGROUND OF THE INVENTION

The invention relates to a heat-resistant optical fiber and a method of manufacturing the same.

A previously known heat-resistant optical fiber is made of a conventional optical fiber comprising a core and a cladding and which has formed on the outer peripheral surface, a polyimide resin coating further having formed on its outer periphery, a metallic coating (see, for example, Japanese Unexamined Utility Model Application No. HEI6-82608 (1994)).

Another known heat-resistant optical fiber is provided with a polyimide resin coating on the outer peripheral surface of the cladding and a carbon coating formed on the outer peripheral surface of the polyimide resin coating (see, for example, Japanese Unexamined Patent Application No. HEI 8-15585 (1996)).

A method of manufacturing a heat-resistant optical fiber is also known, wherein a metallic coating is formed on the outer peripheral surface of an optical fiber by means of the dipping method or the electroless plating method (see, for example, Japanese Patent No. 2567951).

Moreover, fixing the optical fiber is performed by use of plastic resin or ceramic resin having a smaller linear expansion coefficient (see, for example, Japanese Unexamined Patent Application No. 2004-125846).

A known optical fiber referred to by the term "grating fiber" comprises an optical fiber having a photo sensitive core which is provided on the outer peripheral surface with a covering made of ultraviolet-curing resin, silicon resin or carbon, and is also provided at a part of the core with a grating part by applying light from sidewise of the covered optical fiber (see, for example, Japanese Unexamined Patent Application No. HEI 10-82919 (1998)).

Furthermore, there is known to public a technology using an optical fiber fitted into a stainless capillary in order to provide an intrusion detection line which an intruder breaks to thereby cause the intrusion to be detected (see, for example, Japanese unexamined patent application 2000-306167).

Another conventional technology uses an optical fiber fitted into a stainless capillary in order to provide a strain detection line for monitoring strain of bedrock or structures (see, for example, Japanese Unexamined Patent Application No. HEI 10-197297(1998)).

SUMMARY OF THE INVENTION

The foregoing conventional heat-resistant optical fiber improves, by use of the polyimide resin coating, the "bending strength" of the optical fiber comprising the core and the cladding, and improves heat-resistant properties, by forming a metallic coating or a carbon coating on the outer peripheral surface of the polyimide resin coating.

However, further higher heat-resistant properties are required, for example, in such application as measuring vibration, temperatures, or the like with a number of optical fiber coils set on bedrock near magma of volcanoes.

The technological method of forming the metallic coating on the outer peripheral surface of optical fiber using the Dipping Method has a problem of deterioration of properties of optical fiber from stress caused when melted metal is set hard. Furthermore, forming the metallic coating on the optical fiber's outer peripheral surface using the electroless plating method has a problem of low productivity due to the fact that the film forming speed is very slow.

In addition, the foregoing conventional grating fiber has a problem that when a strong light is applied sidewise of the covered fiber, the covering made of any of the materials such as ultraviolet-curing resin, silicon resin or carbon burns and wastes from the burning, happen to stick onto the surface of optical fiber.

In instances where the wastes from the burning stick onto the optical fiber surface, a problem results, making unstable controlling of reflective index and also damaging stability of the grating part.

In view of the above problems, the light may be applied after the covering is first removed so that damaging stability of the grating part by the wastes from burning is prevented. But, this creates another problem of increase of the number of manufacturing processes.

Furthermore, the foregoing conventional optical fiber fitted into stainless capillary has a problem of insufficient heat-resistant properties of optical fiber (particularly, the covering).

Under the above circumstances, an object of the present invention is to provide a heat-resistant optical fiber superior in heat-resistant efficiency, a method of manufacturing the same, and a heat-resistant optical fiber fitted into a protective tubing, and further to provide a heat-resistant optical fiber which is able to be manufactured without necessity of increase of the number of manufacturing processes and which is excellent in stability of the grating part.

On a basis of a first aspect, the present invention provides a heat-resistant optical fiber comprising an optical fiber having a core and a cladding and provided on the outer peripheral surface of the optical fiber with a thin film of microporous silica made chiefly of silicon, the microporous silica porous having many micro apertures.

In the heat-resistant optical fiber according to the first aspect, the micro apertures of the thin film of microporous silica have a cushioning action, so that it is cushioned and prevents a situation in which when the optical fiber is bent, the micro cracks prevalent in the cladding grow and the optical fiber becomes likely to be broken. Hence, the bending strength of the optical fiber is improved. And since the thin film of microporous silica having many micro apertures is made mainly of silicon, it has high heat-resistant effect as of the optical fiber itself, thereby providing a heat-resistant optical fiber having quite excellent heat-resistant properties.

Accordingly, the heat-resistant optical fiber according to the present invention is usable as an optical fiber coil for detecting vibration, etc., under circumstances of high temperatures, such as bedrocks near magma of a volcano. In accordance with a second aspect, the present invention provides a heat-resistant optical fiber, structured as above, wherein the thin film of microporous silica having many micro apertures is in thickness of 1 μm or less.

The thin film of microporous silica, when made thicker, tends to generate cracks inside when the thicker thin film of microporous silica is bent. Hence, in the heat-resistant optical fiber provided on the basis of the second aspect, thickness of the thin film of microporous silica is set to be 1 μm or less. By this, the thin film of microporous silica is prevented from generating cracks when thin film of microporous silica is bent.

The present invention, on a third aspect, provides a method of manufacturing a heat-resistant optical fiber involving applying on the outer peripheral surface of an optical fiber comprising a core and a cladding, a microporous silica solution and baking the solution, thereby forming a thin film of microporous silica having many micro apertures made chiefly of silicon.

According to the method of manufacturing a heat-resistant optical fiber on the basis of the above third aspect, the heat-resistant optical fiber based on the first aspect could be manufactured continuously.

Upon a fourth aspect, the present invention provides a method of manufacturing a heat-resistant optical fiber structured as above, wherein the microporous silica solution is synthesized, with the sol-gel process, from a mixture of silicon alkoxide, active alcohol for facilitating hydrolyzing reaction, alcohol, and water.

According to the method of manufacturing a heat-resistant optical fiber based on the fourth aspect, the microporous silica solution is synthesized with the sol-gel process, thereby lowering the cost to manufacture.

In accordance with a fifth aspect, the present invention provides a heat-resistant optical fiber characterized in having a metallic coating formed on the outer peripheral surface of the thin film of microporous silica having many micro apertures in the heat-resistant optical fiber.

In the heat-resistant optical fiber based on the fifth aspect, the metallic coating protects the optical fiber and the thin film of microporous silica from the ambient air and an external force. Hence, the heat-resistant optical fiber is quite excellent in heat-resistant efficiency.

On a sixth aspect, the present invention provides a method of manufacturing a heat-resistant optical fiber characterized in that after formation of the thin film of microporous silica having many micro apertures in the method of manufacturing a heat-resistant optical fiber, a metallic coating is formed on the outer peripheral surface of the thin film of microporous silica by applying and baking an organic metal liquid or an organic metal paste.

The method of manufacturing a heat-resistant optical fiber based on the sixth aspect, in which the metallic coating is formed by applying and baking the organic metal liquid or an organic metal paste, does not have the fear or problem of deterioration of properties of the optical fiber as arising in the case using the Dipping method. Moreover, the present manufacturing method shows notably higher productivity in comparison with the case using the electroless plating and is able to manufacture the heat-resistant optical fiber based on the fifth aspect continuously and at high productivity.

In accordance with a seventh aspect, the present invention provides a method of manufacturing a heat-resistant optical fiber characterized in that the organic metal liquid or organic metal paste in the method of manufacturing a heat-resistant optical fiber based on the sixth aspect may be any of liquid gold, precious metal compositions for over-glaze in the state of liquid or paste, gold resinate paste, silver metallo-organic paste, or organic compositions paste containing palladium.

According to the method of manufacturing a heat-resistant optical fiber based on the seventh aspect, a metallic thin film made particularly of gold, silver, platinum, or palladium among precious metal having higher reflectance is formed so that leakage of light from the optical fiber is prevented and loss of transmission of light can be particularly lessened.

On an eighth aspect, the present invention provides a heat-resistant optical fiber characterized in that a protective covering is formed and provided on the outer peripheral surface of the thin film of microporous silica in the heat-resistant optical fiber based on the foregoing first or second standpoint.

In the heat-resistant optical fiber based on the eighth aspect, the protective covering protects the optical fiber and the thin film of microporous silica against ambient air or a foreign force, thereby enabling the heat-resistant optical fiber to be dealt with or handled easily.

In accordance with a ninth aspect, the present invention provides a heat-resistant optical fiber characterized in that a grating part is formed and provided at a part of the core in the heat-resistant optical fiber based on the foregoing first, second, fifth, or eighth aspect.

In the heat-resistant optical fiber based on the ninth aspect, the heat-resistant optical fiber based on the first or second aspect has high heat-resistant efficiency. Thus, even when a strong light is applied during the process of forming the grating part, the thin film of microporous silica does not burn, thereby not generating wastes from burning. As a result, the problem of the refractive index becoming unstable is eliminated, thereby providing a heat-resistant optical fiber excellent in stability of the grating part.

On the tenth aspect, the present invention provides a method of fixing an optical fiber, characterized in that a microporous silica solution made chiefly of silicon is applied is stuck to both of a heat-resistant optical fiber based on the first, second, fifth, eighth, or ninth aspect and a fixture part, and dried so that the heat-resistant optical fiber is fixed to the fixture part.

According to the method of fixing an optical fiber based on the tenth aspect, the microporous silica solution is dried to form the microporous silica, thereby fixing the optical fiber to the fixture part. The microporous silica shows high heat-resistant properties since the principal constituent is silicon dioxide.

On an eleventh aspect, the present invention provides a method of fixing an optical fiber, characterized in that the fixture part in the method of fixing an optical fiber based on the tenth aspect is a part of ceramic material.

According to the method of fixing an optical fiber based on the eleventh aspect, the fixture part is a part of ceramic material, such as alumina, ceramics, concrete, or rock, so that it has high heat-resistant properties.

According to a twelfth aspect, the present invention provides a heat-resistant optical fiber fitted into a protective tube, characterized in that there are provided a heat-resistant optical fiber based on the first, second, fifth, eighth, or ninth aspect, and a protective tube into which the heat-resistant optical fiber is inserted.

According to the heat-resistant optical fiber fit into the protective tube based on the twelfth aspect, since the microporous silica film's principal constituent is silicon, it has very high heat-resistant properties. But, if the thin film of microporous silica is poor in tensile strength or the like to thereby be hard to be dealt with, for example, the optical fiber would be broken upon laying operation. The optical fiber when inserted into the protective tube is given supplementary strength by the protective tube, thereby enabling the optical fiber to be easily dealt with out breakage upon the laying operation.

The heat-resistant optical fiber fitted into the protective tube is usable for a communication fiber for WDM system.

Next, the present invention will be further detailed with referring to specific embodiments shown in the drawings. The present invention should not be limited to the detailed explanation.

DETAILED DESCRIPTION OF THE PREFERRED EMBODIMENT

Embodiment 1

Figure 1:
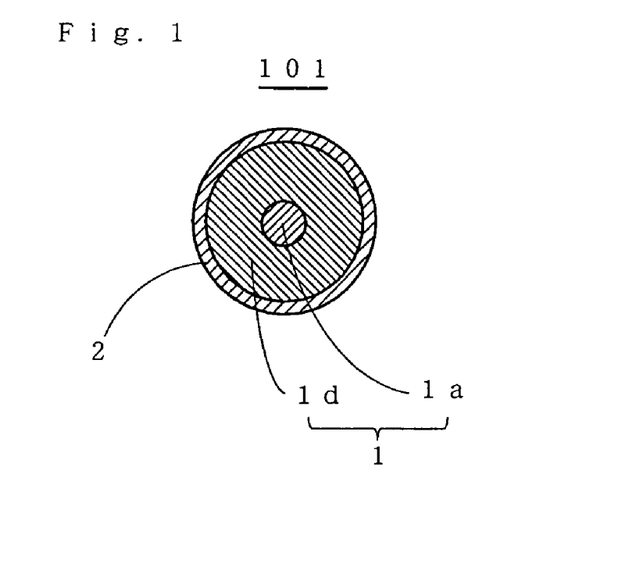
FIG. 1 is a sectional view showing a heat-resistant optical fiber according to Embodiment 1.

FIG. 1 is a sectional view showing a heat-resistant optical fiber 101 according to the embodiment 1.

The heat-resistant optical fiber 101 comprises, or is structured with, an optical fiber 1, which includes a core 1a and a cladding 1d and is made of quartz or glass, and a thin film of microporous silica 2 made chiefly of silicon and formed on the outer peripheral surface of the optical fiber 1. The microporous silica has many micro apertures and forms the thin film of microporous silica 2.

Numerical exemplification is that the core 1a has a diameter of 10 μm and the cladding 1d, a diameter of 125 μm.

The thin film of microporous silica 2 has a thickness of 20 nm(=0.02 μm) and has on the outer peripheral surface many micro apertures in diameter of 2 nm or less.

Figure 2:
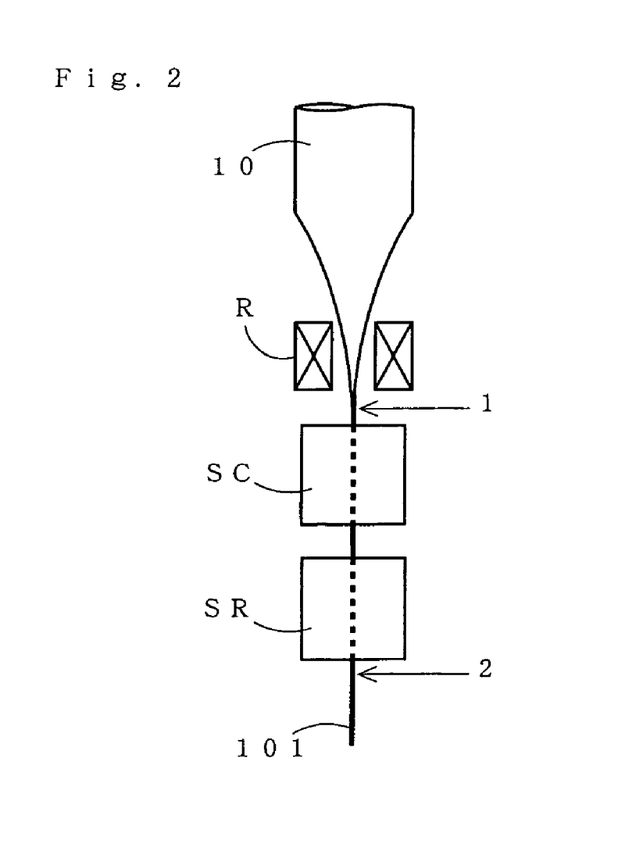
FIG. 2 is an explanatory view showing the manufacturing process of the heat-resistant optical fiber according to Embodiment 1.

FIG. 2 is an explanatory view showing a manufacturing process of the heat-resistant optical fiber 101.

To the optical fiber 1 drawn out of a preform 10 through a heating furnace R, a microporous silica solution is applied by an applying unit SC for applying the microporous silica solution, followed by baking at a baking unit SR to form the thin film of microporous silica 2, thereby completing manufacturing of the heat-resistant optical fiber 101.

Figure 3:
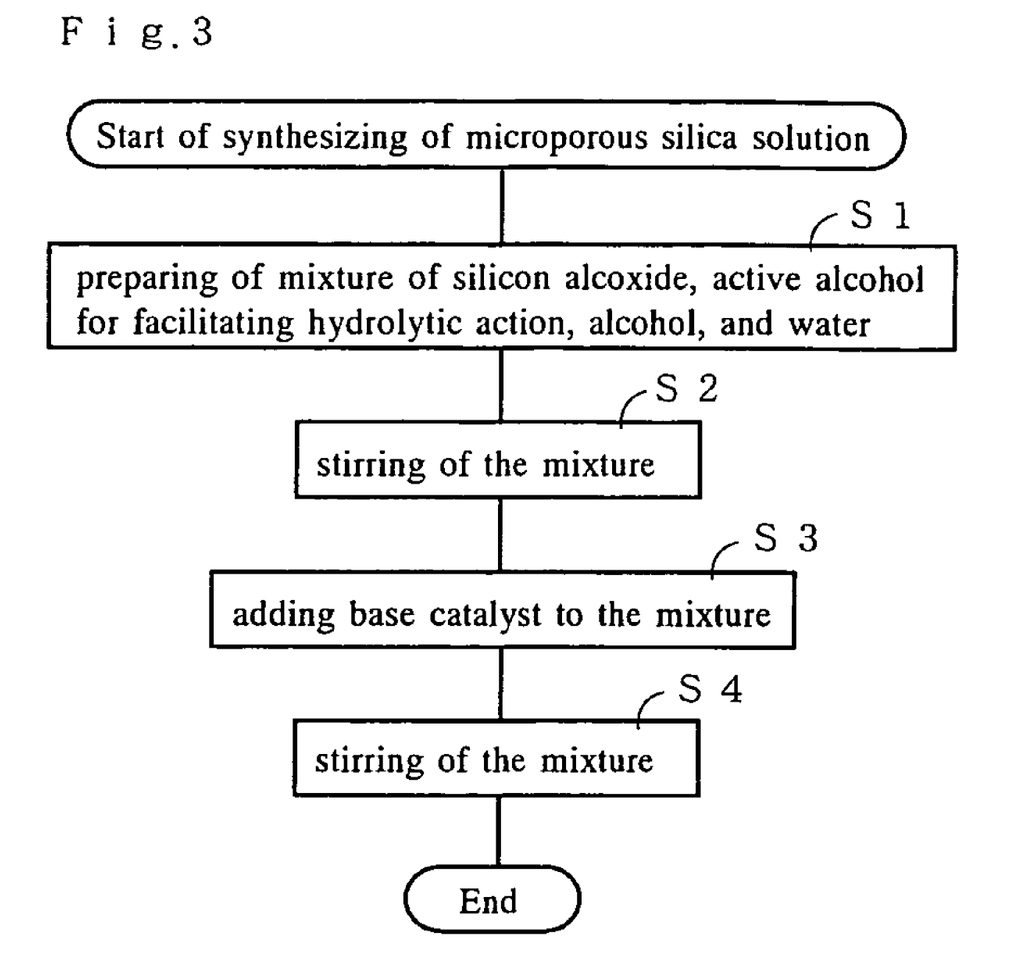
FIG. 3 is a flow chart showing the synthesizing process of the microporous silica solution with the sol-gel process.

FIG. 3 is a flow chart of the synthesizing process of the microporous silica solution by use of the sol-gel process.

In the step S1, a mixture of silicon alcoxide, active alcohol for facilitating hydrolytic reaction, alcohol, and water is prepared.

Silicon alcoxide may be provided in the form of, for example, TMOS (tetramethoxysilane) or TEOS (tetraethylorthosilicate).

Active alcohol for facilitating hydrolytic reaction may use, for example, hydroxyacetone, 1-pentene-3-ol, or acetone cyanohydrin.

Alcohol used may include, for example, methanol, ethanol, propanol, or butanol.

In the step S2, the mixture is stirred.

In the step S3, base catalyst is added into the mixture.

In the step S4, the mixture is stirred.

The microporous silica solution is synthesized according to the above steps.

The method of synthesizing the microporous silica solution has been published in the "Bulletin 2001 Autumn Meeting 34th Chemical Engineering Association" and is also disclosed in Japanese Unexamined Patent Application No. 2004-292190.

According to the heat-resistant optical fiber 101 of the embodiment 1, growth of micro cracks existing in the cladding 1d which is the cause of deterioration of strength of the optical fiber is restrained by the thin film of microporous silica 2, thereby preventing the deterioration of strength of the optical fiber. Moreover, the micro apertures of the thin film of microporous silica 2 provide the function of cushioning, thereby improving bending strength of the optical fiber 1. And the thin film of microporous silica 2 whose principal constituent is silicon has high heat-resistant properties, resulting in the heat-resistant optical fiber having quite excellent heat-resistant properties and strength.

Embodiment 2

Figure 4:
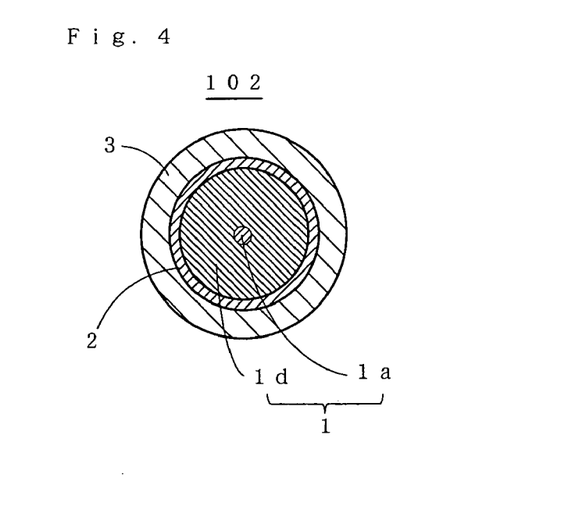
FIG. 4 is a sectional view showing a heat-resistant optical fiber according to Embodiment 2.

FIG. 4 is a sectional view showing a heat-resistant optical fiber 102 according to the embodiment 2.

The heat-resistant optical fiber 102 comprises, or is structured with, an optical fiber 1, which consists of a core 1a and a cladding 1d and is made of quartz or glass, a thin film of microporous silica 2 made chiefly of silicon and formed on the outer peripheral surface of the optical fiber 1, and a metallic coating 3 made of gold, silver, platinum, palladium, rhodium, chrome, bismuth, thorium, or, their alloy and formed on the outer peripheral surface of the thin film of microporous silica 2.

Numerical exemplification is that the core 1a has a diameter of 10 μm and the cladding 1d a diameter of 125 μm.

The thin film of microporous silica 2 has a thickness of approximately 500 nm(=0.5 μm) and has on the outer peripheral surface many micro apertures in diameter of 2 nm or less.

In case that the thin film of microporous silica 2 is set to be larger in thickness, generation of cracks in the thin film of microporous silica 2 can occur when the heat-resistant optical fiber is bent. Hence, it is preferable that thickness of the thin film of microporous silica 2 is set to 1 μm or less in order to prevent cracks from being generated in the thin film of microporous silica 2 when the heat-resistant optical fiber is bent.

The metallic coating 3 has a thickness of 20 μm or less. 50% or more of the composition of the metallic coating 3 is metallic component.

Figure 5:
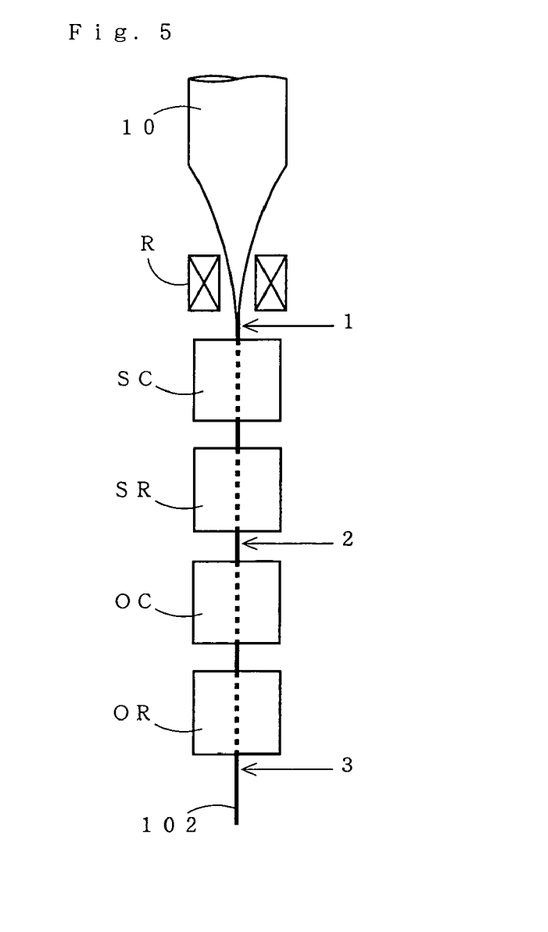
FIG. 5 is an explanatory view showing the manufacturing process of the heat-resistant optical fiber according to Embodiment 2.

FIG. 5 is an explanatory view showing a manufacturing process of the heat-resistant optical fiber 102.

To the optical fiber 1 drawn out of a preform 10 through a heating furnace R, a microporous silica solution is applied by an applying unit SC for applying the microporous silica solution, followed by baking at a baking unit SR to form the thin film of microporous silica 2.

An organic metal liquid or an organic metal paste is applied onto the outer periphery of the thin film of microporous silica 2 by an applying unit OC for applying the organic metal, followed by baking at a baking unit OR to form the metallic coating 3, thereby completing manufacturing of the heat-resistant optical fiber 102.

The organic metal liquid or organic metal paste may be liquid gold, precious metal compositions for over-glaze in the state of liquid or paste, gold resinate paste, silver(Ag) metallo-organic paste, organic compositions paste containing palladium, or the like.

Liquid gold is commercially available, for example, liquid gold for over-glaze put on the market by Japan Liquid Gold Co. Ltd. (Kasugai City, Aichi Prefecture).

A precious metal composition for over-glaze in the state of liquid or paste has been disclosed, for example, in Japanese Examined Patent Application No. HEI 7-6067 (1995).

Gold resinate paste has been disclosed, for example, in Japanese Patent No. 3203672.

Silver (Ag) metallo-organic paste has been disclosed, for example, in Japanese Unexamined Patent Application No. HEI 10-204297(1998).

Organic compositions paste containing palladium has been disclosed, for example, in Japanese Patent No. 3232057.

For a specific example, liquid gold HY-1991 (trade name) made by Japan Liquid Gold Co. Ltd. is applied by the organic metal applying unit OC, followed by drying at 150° C. for five minutes by the baking unit OR and also calcining at 600° C. for five minutes by the baking unit OR, thereby forming 0.1 μm thick gold alloy thin film 3 (gold is 90% or more, and rhodium, chrome, bismuth, thorium, etc are contained).

According to the manufacturing method shown in FIG. 5, there is no problem of deterioration of properties of optical fiber as that of the Dipping Method. And productivity can be notably improved in comparison with the electroless plating method.

According to the heat-resistant optical fiber 102 of the embodiment 2, the thin film of microporous silica 2 has micro apertures, so that the metallic coating 3 is able to firmly stick to the thin film of microporous silica 2. The metallic coating 3 protects the optical fiber 1 and the thin film of microporous silica 2 against ambient air and an external force. Thus, a heat-resistant optical fiber excellent in heat-resistant efficiency and strength is provided.

Embodiment 3

Figure 6:
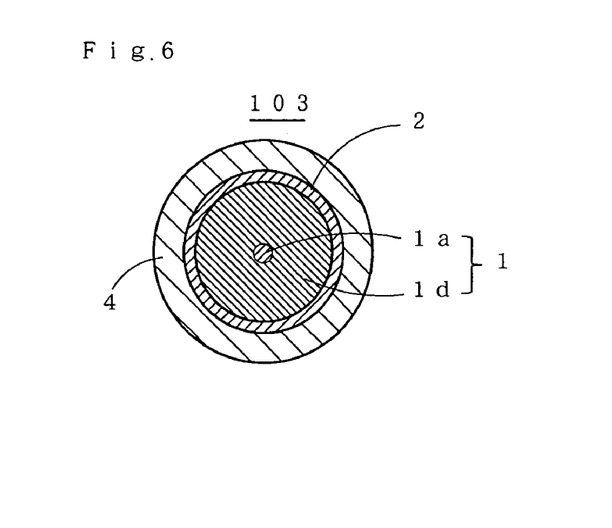
FIG. 6 is a sectional view showing a heat-resistant optical fiber according to Embodiment 3.

FIG. 6 is a sectional view showing a heat-resistant optical fiber 103 according to the embodiment 3.

The heat-resistant optical fiber 103 comprises, or is structured with, an optical fiber 1, which is comprised of a core 1a and a cladding 1d and is made of quartz or glass, a thin film of microporous silica 2 made chiefly of silicon dioxide and formed on the outer peripheral surface of the optical fiber 1, and a resin covering 4 formed on the outer peripheral surface of the thin film of microporous silica 2.

Figure 7:
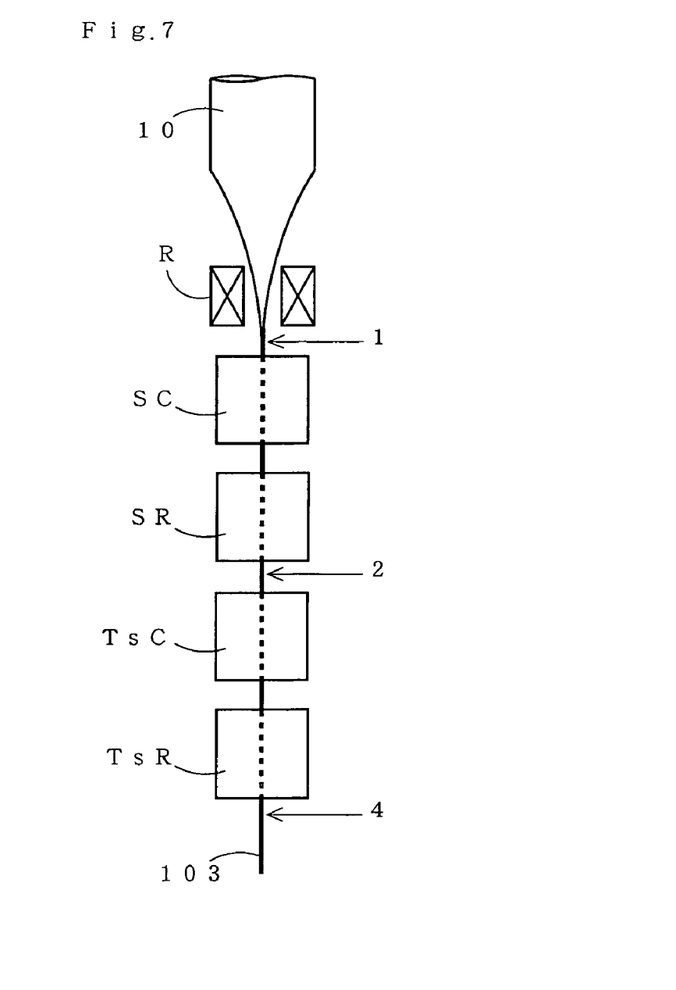
FIG. 7 is an explanatory view showing the manufacturing process of the heat-resistant optical fiber according to Embodiment 3.

FIG. 7 is an explanatory view showing a manufacturing process of the heat-resistant optical fiber 103.

To the optical fiber 1 drawn out of a preform 10 through a heating furnace R, a microporous silica solution is applied by an applying unit SC for applying the microporous silica solution, followed by baking at a baking unit SR to form the thin film of microporous silica 2.

Next, to the outer peripheral part of the thin film of microporous silica 2, thermoset resin, such as silicon, polyimide, epoxy, or urethane or the like, is applied by an applying unit TsC for applying the thermoset resin, followed by baking at a baking unit TsR to form the resin covering 4, thereby completing manufacturing of the heat-resistant optical fiber 103.

According to the heat-resistant optical fiber 103 of the embodiment 3, handling or dealing with the heat-resistant optical fiber is made easy.

Embodiment 4

Figure 8:
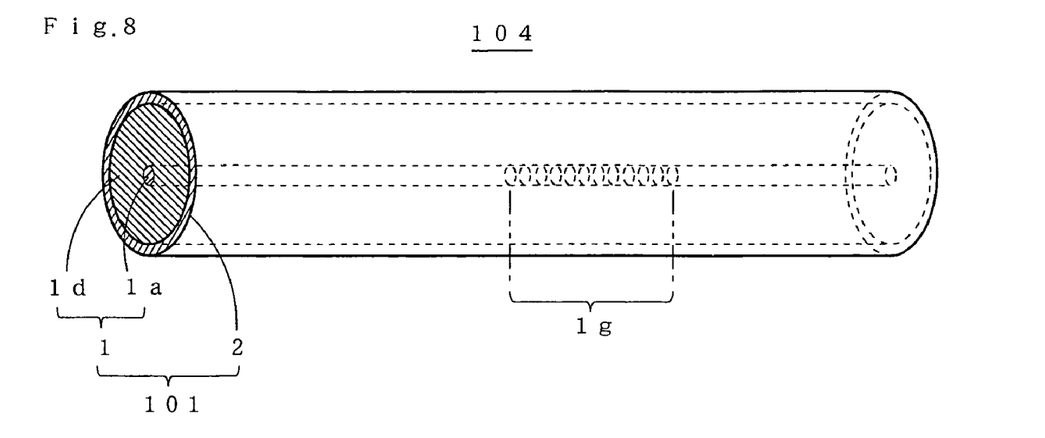
FIG. 8 is a side view showing a heat-resistant optical fiber according to Embodiment 4.

FIG. 8 is a sectional view showing a heat-resistant optical fiber 104 according to the embodiment 4.

The heat-resistant optical fiber 104 comprises, or is structured with, an optical fiber 1, which consists of a core 1a and a cladding 1d and is made of quartz or glass, a thin film of microporous silica 2 made chiefly of silicon dioxide and formed on the outer peripheral surface of the optical fiber 1, and a grating part 1g formed at a part of the core 1a by applying light sidewise of the heat-resistant optical fiber 101 having the thin film of microporous silica 2.

Numerical exemplification is that the core 1a has a diameter of 10 μm and the cladding 1d a diameter of 125 μm.

The thin film of microporous silica 2 has a thickness of approximately 500 nm(=0.5 μm) and has, on the outer peripheral surface, many micro apertures in diameter of 2 nm or less.

Figure 9:
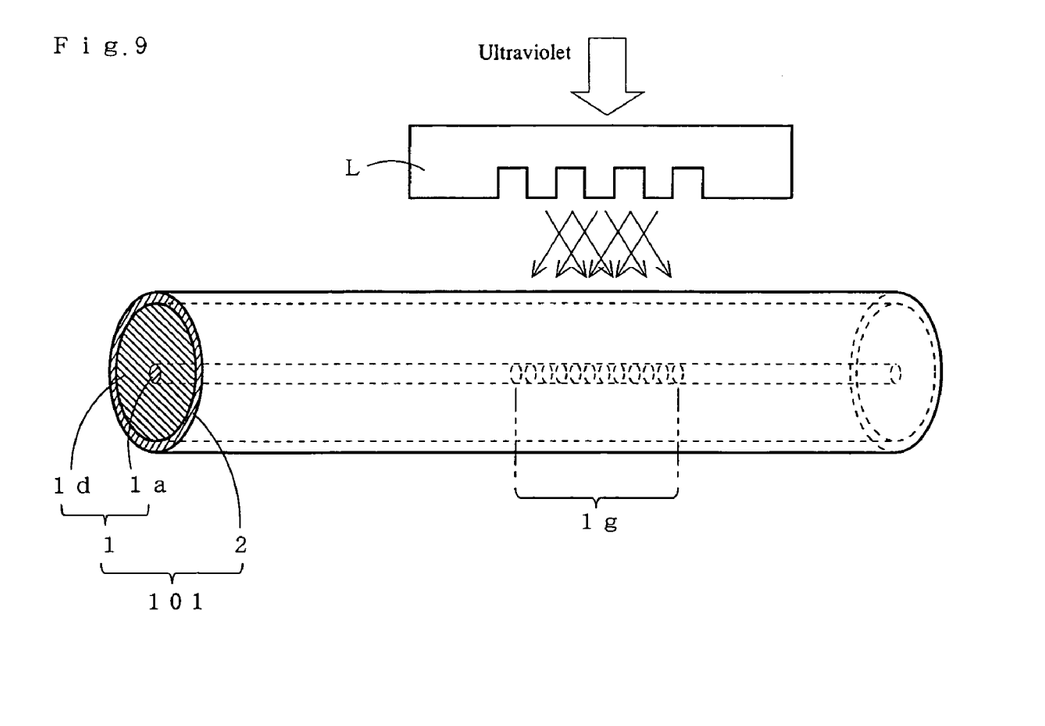
FIG. 9 is a conception explanatory view showing a forming process of a grating part with "Phase-Mask" Method.

FIG. 9 is a concept explanatory view showing a forming process of the grating part 1g by means of the Phase-mask method.

Ultraviolet is applied through a phase-mask L sidewise of the heat-resistant optical fiber 101 to thereby form the grating part 1g at a part of the core 1a.

The grating part 1g may be formed otherwise by means of the Two Beam Interference Method.

According to the heat-resistant optical fiber 104 of the embodiment 4, the heat-resistant optical fiber 101 has high heat-resistant properties. Thus, in the forming process of the grating part 1g, when high light is applied, the covering, i.e., the thin film of microporous silica 2, does not burn, thereby generating no wastes from burning. As a result, a situation in which control of refractive index is made unstable is essentially avoided, thereby providing the heat-resistant optical fiber 104 showing excellent stability of the grating part 1g.

Embodiment 5

Figure 10:
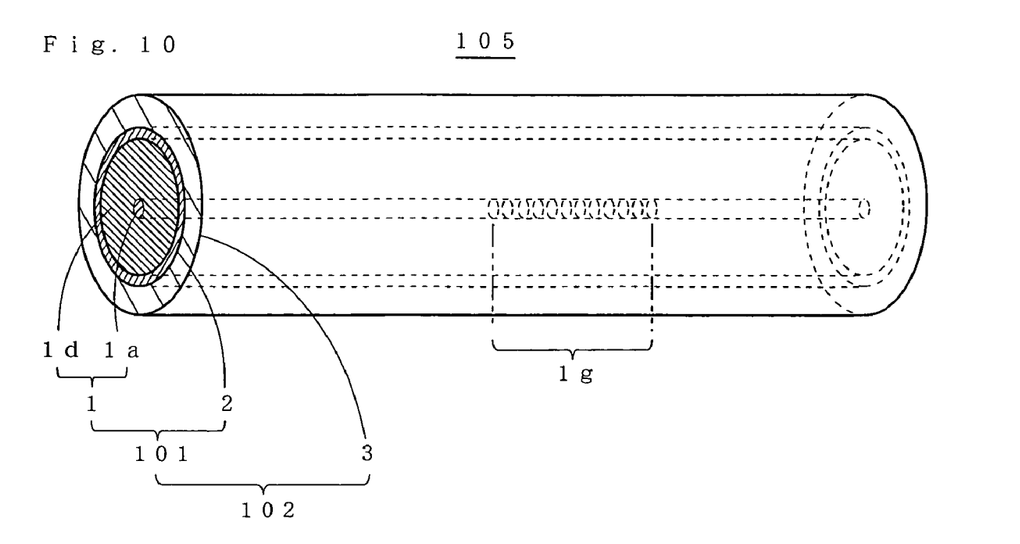
FIG. 10 is a side view showing a heat-resistant optical fiber according to Embodiment 5.

FIG. 10 is a sectional view showing a heat-resistant optical fiber 105 according to the embodiment 5.

The heat-resistant optical fiber 105 comprises or is structured with: a heat-resistant optical fiber 104, which is provided with an optical fiber 1 having a core 1a and a cladding 1d and made of quartz or glass, a thin film of microporous silica 2 made chiefly of silicon dioxide and formed on the outer peripheral surface of the optical fiber 1, and a grating part 1g formed at a part of the core 1a by applying light sidewise of the heat-resistant optical fiber 101 having the thin film of microporous silica 2; and a metallic coating 3 made of gold, silver, platinum, palladium, rhodium, chrome, bismuth, thorium, or the like, or their alloy and formed on the outer peripheral surface of the thin film of microporous silica 2 of the heat-resistant optical fiber 104.

The method of forming the metallic coating 3, similarly to the embodiment 2, involves the application of an organic metal liquid or an organic metal paste to the outer periphery of the thin film of microporous silica 2, followed by baking.

Embodiment 6

Figure 11:
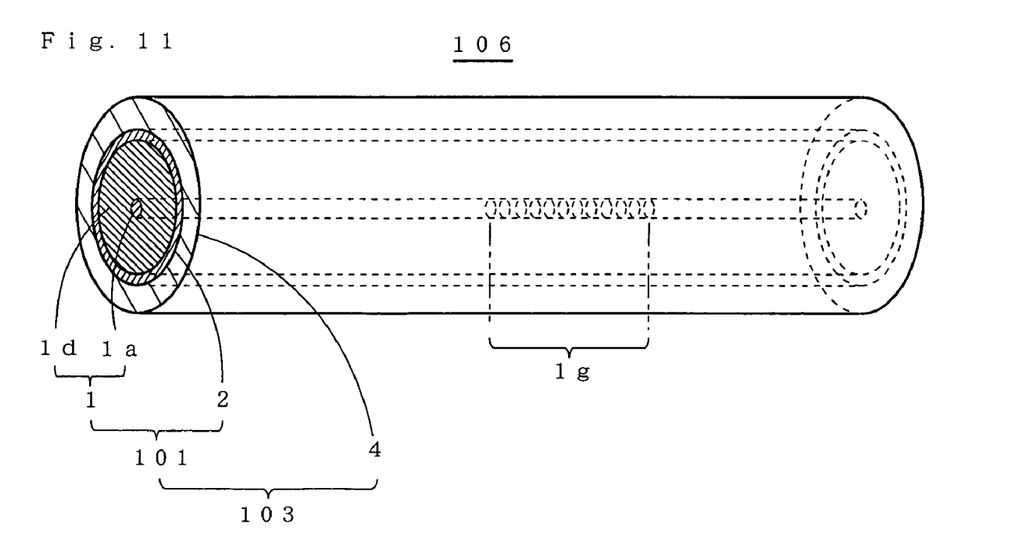
FIG. 11 is a side view showing a heat-resistant optical fiber according to Embodiment 6.

FIG. 11 is a sectional view showing a heat-resistant optical fiber 106 according to the embodiment 6.

The heat-resistant optical fiber 106 comprises or is structured with: a heat-resistant optical fiber 103, which is provided with an optical fiber 1 having a core 1a and a cladding 1d and made of quartz or glass, a thin film of microporous silica 2 made chiefly of silicon dioxide and formed on the outer peripheral surface of the optical fiber 1, and a grating part 1g formed at a part of the core 1a by applying light sidewise of the heat-resistant optical fiber 101 having the thin film of microporous silica 2; and a resin covering 4 formed on the outer peripheral surface of the thin film of microporous silica 2 of the heat-resistant optical fiber 103.

The method of forming the resin covering 4 is similar to the embodiment 3.

Embodiment 7

Figure 12:
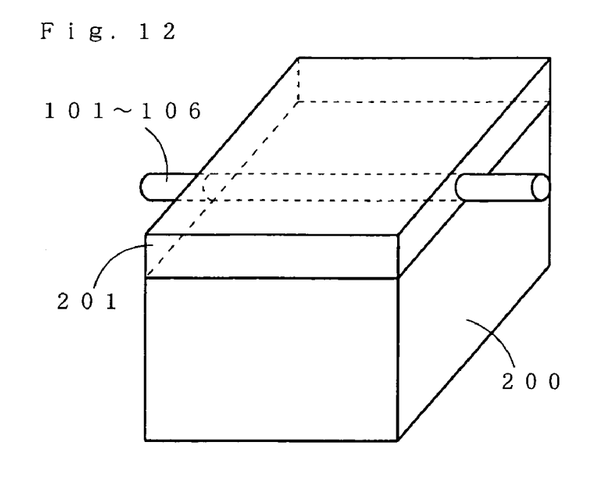
FIG. 12 is a perspective view showing a method of fixing an optical fiber according to Embodiment 7.

FIG. 12 is a perspective view showing a method of fixing an optical fiber according to the embodiment 7.

The heat-resistant optical fiber 101 through 106 of the embodiments 1 through 6 is placed on the fixture part 200 to be joined thereto. The microporous silica solution, made substantially of silicon, is applied to adhere to both of the heat-resistant optical fiber 101 to 106 and the fixture part 200, followed by heating and drying to form a microporous silica 201, so that the optical fiber 101 to 106 is fixed onto the fixture part 200.

The fixture part 200 may be a part of ceramic material such as alumina, ceramics, concrete, rocks or the like.

Numerical exemplification is that outer diameter of the optical fiber 101 to 106 is about 166 μm. Thickness of the microporous silica 201 is about 200 μm.

According to the method of fixing the optical fiber of the embodiment 5, the microporous silica 201, which is made chiefly of silicon, has excellent heat-resistant properties.

Embodiment 8

Figure 13:
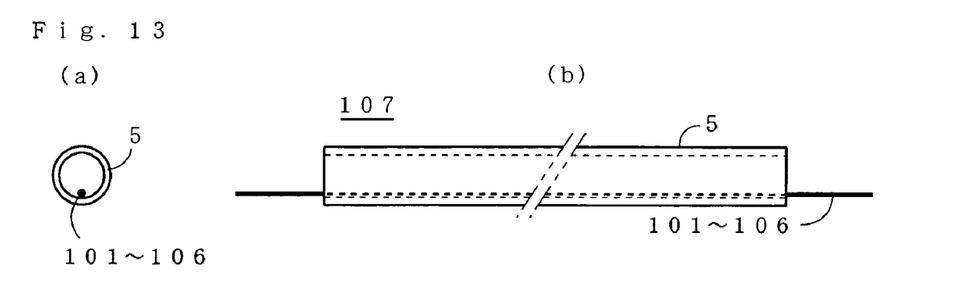
FIG. 13 is a front view and a side view showing a heat-resistant optical fiber fit into a protective tube according to Embodiment 8.

FIG. 13 is a front view and a side view showing a heat-resistant optical fiber 107 fitted into a protective tube according to the embodiment 8.

The heat-resistant optical fiber 107 fitted into the protective tube comprises a heat-resistant optical fiber 101 through 106 of the embodiments 1 to 6 and a protective tube 5 into which the heat-resistant optical fiber is inserted.

The protective tube 5 is a metallic conduit made of stainless steel, copper or the like.

Figure 14:
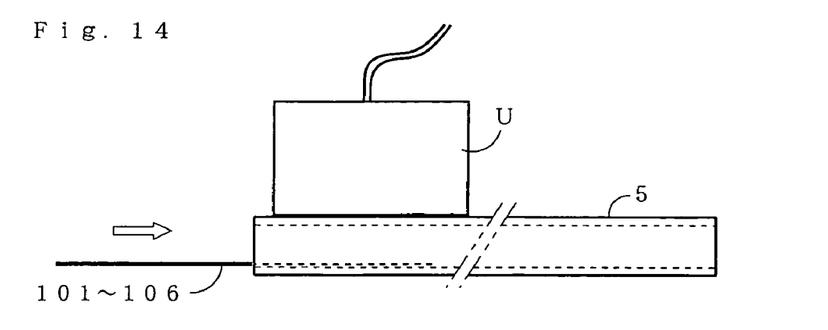
FIG. 14 is an explanatory view showing a method of manufacturing a heat-resistant optical fiber fit into a protective tube according to Embodiment 8.

As shown in FIG. 14, the heat resistant optical fiber 101 to 106 is inserted into the protective tube 5 with ultrasonic oscillator U being contacted with the protective tube 5 for applying ultrasonic oscillation thereto, thereby enabling work of inserting the optical fiber to be easily carried out.

In place of, or in addition to, applying ultrasonic oscillation to the protective tube 5, with ultrasonic oscillator U being contacted with the heat-resistant optical fiber 101 to 106 for applying thereto ultrasonic oscillation, the heat-resistant optical fiber 101 to 106 may be inserted into the protective tube 5.

According to the heat-resistant optical fiber 107 of the embodiment 8, the thin film of microporous silica 2, which is made chiefly of silicon, has excellent heat-resistant properties. In addition, the heat-resistant optical fiber 101 to 106 is inserted into the protective tube 5, so that strength is supplemented. Hence, the optical fiber is easily handled or dealt without incidence of breakage upon a laying operation. Furthermore, the heat-resistant optical fiber having the resin covering 4 formed on the outer peripheral surface facilitates inserting of the heat-resistant optical fiber into the protective tube 5.

What we claimed is:

1. A method of fixing an optical fiber to a fixture part, comprising:
   providing a heat-resistant optical fiber including a core and a cladding, and a thin film of microporous silica made substantially of silicon, having on an outer surface thereof micro apertures 2 nm or less in diameter, said thin film being formed on an outer peripheral surface of the optical fiber;
   placing said heat-resistant optical fiber on an exterior surface of the fixture part to be joined thereto;
   applying a microporous silica solution made substantially of silicon over said heat-resistant optical fiber and said exterior surface to cover both said heat-resistant optical fiber and said fixture part; and
   drying said microporous silica solution to form a microporous silica layer so that the heat-resistant optical fiber is fixed onto the exterior surface of said fixture part.

2. A method of fixing an optical fiber as set forth in claim 1 wherein the fixture part is a part of ceramic material.

3. A method according to claim 1, wherein a thickness of the thin film of microporous silica is 1 μm or less.

* * * * *